United States Patent [19]
Behlman

[11] Patent Number: 5,215,205
[45] Date of Patent: Jun. 1, 1993

[54] ARTICLE ORGANIZER

[76] Inventor: David M. Behlman, 21950 Haan Ave., Riverside, Calif. 92508

[21] Appl. No.: 433,957

[22] Filed: Nov. 9, 1989

[51] Int. Cl.⁵ .......................................... B65D 25/06
[52] U.S. Cl. .................... 220/4.31; 220/533; 224/42.42
[58] Field of Search ............ 220/22, 22.1, 22.2, 22.3, 4 R, 4 A, 4 F, 4.31, 4.28, 533, 532; 224/42.42, 901; 248/97; 296/37.1, 37.5; 217/13, 12 R, 43 R, 7, 36, 65

[56] References Cited

U.S. PATENT DOCUMENTS

| | | | |
|---|---|---|---|
| 1,456,247 | 5/1923 | Miller | 224/42.42 |
| 1,700,317 | 1/1929 | Kamenstein | 220/22.1 |
| 2,112,498 | 3/1938 | Lax | 217/7 |
| 2,854,724 | 10/1958 | Wuorio | 220/4 F |
| 2,906,482 | 9/1959 | Flint | 220/4 R |
| 2,942,749 | 6/1960 | Rosenberg | 220/4 F |
| 3,067,903 | 12/1962 | Jones | 220/22.1 |
| 3,184,095 | 5/1965 | Brandon | 220/4 F |
| 3,200,983 | 8/1965 | Walter | 220/22 |
| 3,250,421 | 5/1966 | Braun | 220/22 |
| 3,491,909 | 1/1970 | Ikelheimer | 220/22 |
| 3,800,990 | 4/1974 | Richardson | 224/42.42 |
| 4,008,553 | 2/1977 | Oliver | 220/4 F |
| 4,120,119 | 10/1978 | Engel | 220/4 F |
| 4,226,348 | 10/1980 | Dottor et al. | 224/42.42 |
| 4,258,856 | 3/1981 | Marling | 220/22.3 |
| 4,261,465 | 4/1981 | Thomas | 220/22.3 |
| 4,303,367 | 12/1981 | Bott | 220/22 |
| 4,358,035 | 11/1982 | Heidecker | 224/42.42 |
| 4,540,213 | 9/1985 | Herlitz et al. | 224/42.42 |
| 4,718,584 | 1/1988 | Schoeny | 224/42.42 |
| 4,776,477 | 10/1988 | Walker | 220/22 |
| 4,809,851 | 3/1989 | Oestreich | 220/4 F |
| 4,821,931 | 4/1989 | Johnson | 220/23.86 |
| 4,828,133 | 5/1989 | Hougendobler | 220/22 |
| 4,838,445 | 6/1989 | Lanius | 220/22.3 |
| 4,842,175 | 6/1989 | Towsend | 224/901 |
| 4,846,382 | 7/1989 | Foultner et al. | 224/901 |
| 4,867,327 | 9/1989 | Roland | 220/4 F |
| 4,928,865 | 5/1990 | Lorence et al. | 224/42.42 |
| 4,942,990 | 7/1990 | White | 224/901 |
| 4,944,544 | 7/1990 | Dick | 296/37.1 |
| 4,946,215 | 8/1990 | Taylor | 224/42.42 |

Primary Examiner—Allan N. Shoap
Assistant Examiner—S. Castellano

[57] ABSTRACT

A device for organizing articles is disclosed including a plurality of wall members disconnectably connected together at their ends to form a closed perimeter wall of predetermined configuration. The area bounded by the perimeter wall is subdivided into a plurality of compartments by a primary divider wall and a plurality of subdivider walls wherein the subdivider walls are removable and or repositionable to change the number and size of compartments.

9 Claims, 1 Drawing Sheet ns. More particularly, the invention relates to a disassemblable, compartmentalized organizer for holding articles. In still greater particularity, the invention relates to an organizer especially adaptable for placement on the floor of a trunk or cargo area of a vehicle.

ARTICLE ORGANIZER

BACKGROUND OF THE INVENTION

This invention relates to devices for organizing articles. More particularly, the invention relates to a disassemblable, compartmentalized organizer for holding articles. In still greater particularity, the invention relates to an organizer especially adaptable for placement on the floor of a trunk or cargo area of a vehicle.

It is a common problem when transporting loose articles in the trunk or cargo area of a vehicle that the articles can move about and become intermingled, scattered and generally disorganized due to jostling and jolting caused by the motion of the vehicle. This can be very annoying, for example, when a salesperson's wares become intermingled and can also cause damage to the articles as well as presenting a safety hazard particularly in the case where the cargo area is passenger accessable as in a common station wagon-type vehicle. It would therefore be desirable to provide for a simple organizer that separates and stabilizes articles in the storage compartment of a vehicle. Further, it would be advantageous for such an organizer to be disassemblable for removal and storage when not in use.

SUMMARY OF THE INVENTION

According to the invention, there is provided an article organizer which, although not limited to use with a vehicle, is particularly suited for such application and which is assemblable into a compartmentalized organizer having a closed perimeter wall configured to fit into a predetermined space such as the trunk or cargo area of a vehicle.

According to the invention, the organizer includes a plurality of individual wall members disconnectably connected together at their ends to form a perimeter wall having a predetermined configuration.

According to one feature of the invention, there is provided at least one removable wall that subdivides the area bounded by the perimeter wall into at least two primary compartments.

According to another feature of the invention there is provided at least one subdivider wall removably connected between the at least one primary divider wall and the perimeter wall to further subdivide at least one of the primary compartments into at least two additional compartments.

According to a preferred embodiment of the invention, the walls are connected together by way of disconnectable interlocking slot-type connections.

According to one embodiment, the slot-type connections are dove tail-type connections.

According to a still further important feature of the invention, the bottom edge of at least the perimeter walls are provided with releasable hook and loop type gripper means for engaging cooperating grippers or a carpet on the surface on which the organizer is to be placed.

BRIEF DESCRIPTION OF THE DRAWINGS

The invention will be better understood after reading the following Detailed Description of the Preferred Embodiment in conjunction with the drawings in which.

DETAILED DESCRIPTION OF THE PREFERRED EMBODIMENT

Figure 1:
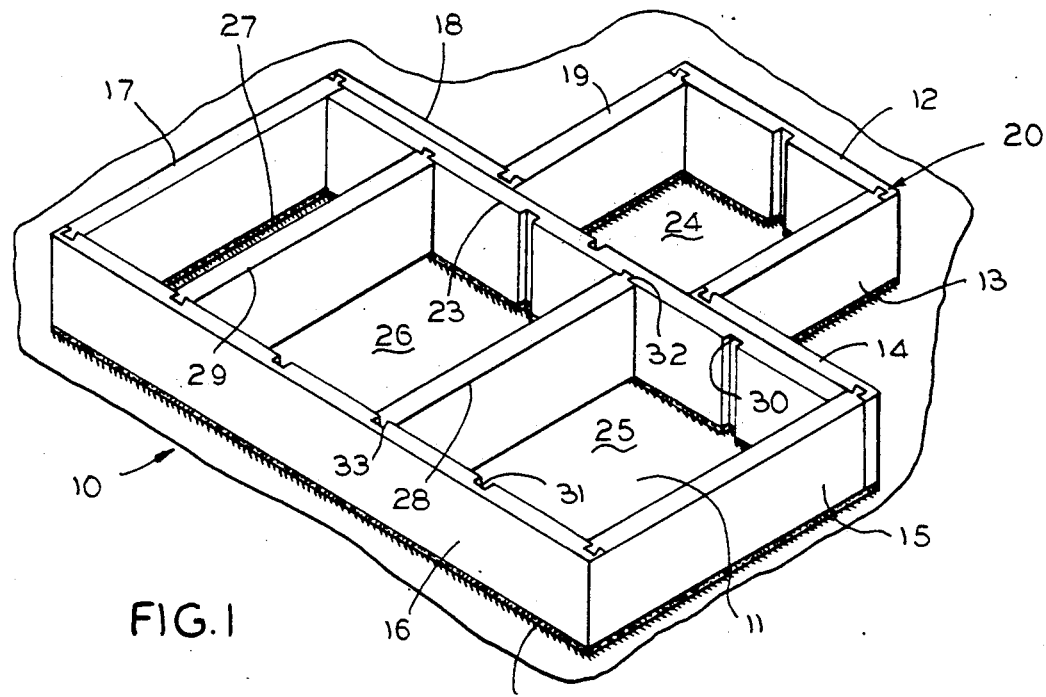
FIG. 1 is a pictorial view of an organizer according to the invention shown in place in the storage compartment of a vehicle.

Shown in FIG. 1 is an organizer 10 positioned on the floor 11 of, for example, the cargo area or trunk of a vehicle, not completely shown in the drawing. The organizer according to the present invention is not limited to use with vehicles but is however especially suited for such applications due to it's unique assemblable, disassemblable construction and in that it can be manufactured to fit into specific space requirements. For example, not all trunks or cargo spaces of vehicles are identically shaped and, further, most such areas typically do not have simple square or rectangular configurations but rather include various discontinuities due to different body configurations whether for functional or esthetic reasons. Accordingly, organizers made in accordance with the present invention can be made to fit in specific areas as desired. The organizer 10 disclosed is accordingly representative of only one configuration.

Referring to FIG. 1, the organizer 10 includes a plurality of plate like wall members 12, 13, 14, 15, 16, 17, 18, 19 which are connected together at their ends to form a closed perimeter wall. Each wall member 12-19 is sized such that when all the members are connected together a continuous closed perimeter wall having a predetermined configuration, for example to fit within a known space, is formed.

As noted above, any perimeter wall shape can be provided for and, although the configuration shown in the drawings and described herein forms an organizer having single step or offset sides, that configuration is only representative and other configurations including, for example, multiple step sidewalls is also possible and contemplated to be within the scope of the invention. The connections between the wall members are disconnectable providing for disassembly and reassembly of the organizer as desired. Preferably, the connections are of a slip-type construction and, further, one that will not inherently separate but, rather, one which provides a large degree of strength and stability. One such slip-type connection construction is a dove tail-type connection 20 shown in FIG. 2. Such connection is easily assembled and disassembled by sliding the expanded triangular shaped tongue 21 provided on one member, such as member 15 in FIG. 2, into the complimentary triangular shaped groove 22 provided in the adjoining wall member, such as member 14 in FIG. 2. It can be seen that this connection cannot be pulled apart and provides for a very rigid perimeter wall when all of the wall members 12-19 are connected together.

The organizer 10 in the embodiments shown further includes at least one primary divider wall 23 which is positionable and supported against the two inwardly projecting perimeter wall members 14, 18. It is to be noted, that in the embodiment shown, the divider wall 23 is a separate wall member not physically connected to any other wall member however, if desired, the wall members 14, 18 could be made as one continuous wall thereby eliminating the separate divider 23. The separate divider construction is preferred since it can be removed if desired to form one large compartment bounded solely by the perimeter walls 12-19. When installed, the divider 23 subdivides the area bounded by the perimeter wall into two primary compartments, one 24 and another formed by the total volume of the individual compartments 25, 26, 27 when the additional subdividers 28, 29 are not used.

It is to be understood that more than one primary divider can be provided for, for example, in the case of an organizer having multiple step sidewalls, a divider could be provided at each step in the same manner as that 23 shown in the present embodiment.

As noted, the primary divider wall 23 and the long perimeter wall 16 are provided with a plurality of pairs of aligned grooves or slots such as the one pair 30, 31 for slidably receiving complimentary tongues, such as the tongues 32, 33 provided on the ends of each of the additional subdividing members, such as 28, 29 shown in FIG. 1. One or more additional subdividing members are installed and removed in any desired pair of aligned slots to further subdivide the second primary compartment into at least two additional compartments. In the embodiment shown in FIG. 1, up to five additional compartments can be provided for by installing additional dividers in each groove pair. Of course any number of compartments desired can be provided for by adding more slot pairs and subdividers. If desired, the other primary compartment 24, or compartments in the case where multiple primary dividers are used, can also be subdivided into at least two additional compartments by inserting an additional subdivider, not shown, into further pairs of aligned slots or grooves, only one pair 44, 45 being shown.

Figure 3:
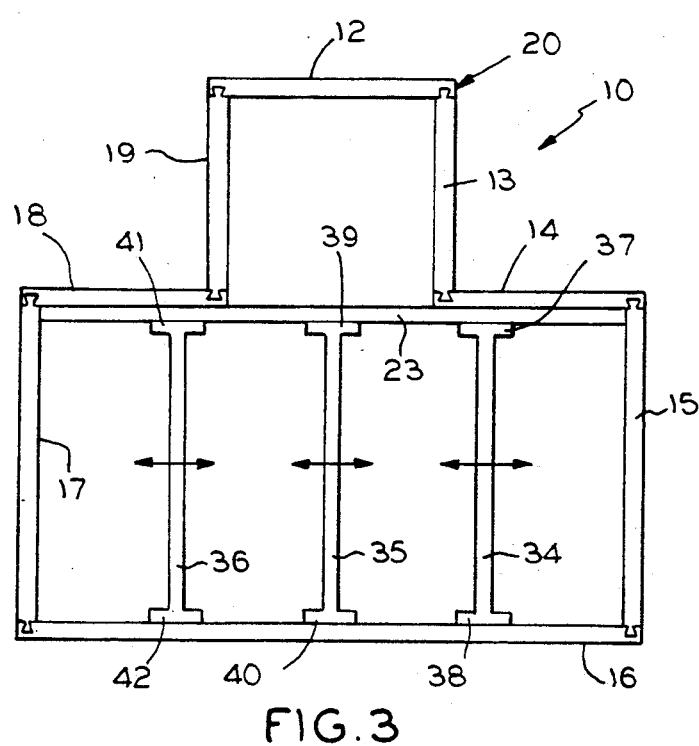
FIG. 3 is a plan view of an alternative embodiment of an organizer having a plurality of laterally slidable partitions.

An alternative subdividing partition member construction is shown in FIG. 3 wherein the subdividers such as 34, 35, 36 are I-shaped, when viewed in plan view, wherein opposing ends 37, 38, 39, 40 and 41, 42 of each subdivider 34, 35, 36 are supported between the perimeter wall 16 and the subdivider 23. The subdividers 34, 35, 36 are not affixed to the wall or to the divider 23 and they are free to be positioned at any location desired to vary the size of the compartments formed. Further, any number of subdividers can be used to increase or decrease the number of compartments. The fit between the ends of each subdivider 34, 35, 36 and the perimeter wall 16 and divider 23 is preferably "snug" and presents enough frictional resistance to securely hold the subdividers in place against movement of articles being retained in the containers but so as to allow the user to be able to slide them laterally relative to each other to desired positions, as indicated by the arrows 46, 47, 48 in FIG. 3.

Figure 2:
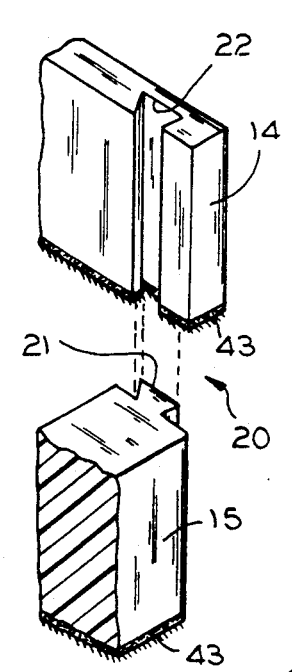
FIG. 2 is an exploded view of a slot-type disconnectable connection connecting the ends of the perimeter wall members together.

As shown in FIGS. 1 and 2, the bottom edge of at least the perimeter wall members are provided with a hook and loop type gripper 43, such as VELCRO, which will releasably retain the organizer to, for example, a carpet on the surface on which the organizer is to be placed or, alternatively a corresponding cooperating hook and loop gripper can also be secured on the surface on which the organizer is to be placed in a pattern matching the organizer's perimeter wall configuration which will be engaged by the gripper on the bottom of the perimeter wall to securely hold the organizer to the surface which it is placed.

As noted, many configurations and sizes of organizers are possible. For example, it is contemplated that a typical organizer would be made from a plastic material, such as ¼" to ¾" plexiglass, and would have a wall height on the order of about 6 to 8 inches which would hold most common articles including grocery bags and sales and service person's wares and tools.

Having the described the preferred embodiment of the invention, those skilled in the art and having the benefit of that description and the accompanying drawings can readily devise other embodiments and modifications and such other embodiments and modifications are to be considered to be within the scope of the appended claims.

What is claimed is:

1. An organizer comprising:
    a plurality of wall members including means for disconnectably connecting said wall members together at their ends into a closed perimeter wall of predetermined shape including steps in said closed perimeter wall at generally opposite locations defining an area bounded by said perimeter wall including at least two rectangular areas of different dimensions;
    at least one primary divider wall spanning completely across the area bounded by the perimeter wall, portions of one side of said primary divider wall at opposite end thereof respectively supported against surfaces formed by said steps facing into said area and at least one subdivider wall removably connected to and extending between said at least one primary divider wall and said perimeter wall.

2. The organizer as defined in claim 1 wherein said wall members are connected together and said at least one subdivider wall is connected to said at least one primary divider wall and to said perimeter wall by a slot type connection.

3. The organizer as defined in claim 2 wherein the slot type connection at least between said wall members is a dove tail type connection.

4. The organizer as defined in claim 1 wherein said at least one subdivider wall is laterally relatively positionable.

5. The organizer as defined in claim 3 including releasable gripping means on one edge of at least said wall members.

6. An organizer comprising:
    a plurality of perimeter wall members including means for disconnectably connecting said wall members together to form a closed perimeter wall having a predetermined configuration defining an area bounded by said perimeter wall, wherein opposing portions of said perimeter wall each include at least one step, each step presenting a surface facing into the area bounded by the perimeter wall;
    at least one primary divider wall extending completely across the area bounded by the perimeter wall between said opposing portions of said perimeter wall, portions of one side of said primary divider wall at opposite ends thereof respectively supported against said surfaces of each of said steps that face into the area bounded by the perimeter wall, said at least one primary divider wall subdividing said area into at least two primary compartments; and
    at least one removable subdivider wall extending between a second surface of said at least one primary divider wall and said perimeter wall, said subdivider wall holding said portions of said one surface of said primary divider wall against said surfaces of each said step and subdividing at least one of said at least two primary compartments into at least two additional compartments.

7. The organizer as defined in claim 6 wherein said at least one primary divider wall includes at least one slot, said at least one subdivider wall is slidably received in said slot.

8. The organizer as defined in claim 6 wherein said at least one subdivider wall is removably connected to said at least one primary divider wall by a tongue and groove type connection.

9. The organizer as defined in claim 6 wherein said at least one subdivider wall is an I-shaped member frictionally engaged between said at least one primary divider wall and said perimeter wall, said I-shaped member being slidable along said at least one primary divider wall and said perimeter wall.

* * * * *